United States Patent Office 3,749,789
Patented July 31, 1973

3,749,789
ANTHELMINTIC COMPOSITIONS CONTAINING BENZIMIDAZOLES AND METHOD OF USE
Michael H. Fisher, Somerville, N.J., assignor to Merck & Co., Inc., Rahway, N.J.
No Drawing. Filed Feb. 27, 1970, Ser. No. 15,224
Int. Cl. A61k 27/00
U.S. Cl. 424—273                                    6 Claims

ABSTRACT OF THE DISCLOSURE

Substituted 2-trifluoromethyl and 2-pentafluoroethyl benzimidazoles of the formula:

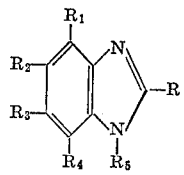

wherein R is —$CF_3$ or —$CF_2CF_3$; $R_1$, $R_2$, $R_3$ and $R_4$ are H, F, Cl, Br or I, provided that only one of $R_1$, $R_2$, $R_3$ and $R_4$ is H; and $R_5$ is H, loweralkyl, loweralkenyl, loweralkoxyloweralkyl, carboxyloweralkyl and loweralkylesters thereof, loweralkanoyl or aminoloweralkanoyl and the N-loweralkyl and N,N-diloweralkyl derivatives thereof; and alkali metal and alkaline earth metal and pharmaceutically acceptable amine salts thereof when $R_5$ is hydrogen or carboxyloweralkyl, and salts thereof with pharmaceutically acceptable acids when $R_5$ is aminoloweralkyl, are employed as the essential active ingredient in anthelmintic formulations and feed stuffs intended for the treatment and control of helminthiasis in animals.

This invention relates to compounds active as anthelmintic agents and to anthelmintic formulations containing such compounds as the essential active ingredient. More particularly, the instant invention relates to certain 2-trifluoromethyl- and 2-pentafluoroethylbenzimidazoles which are effective anthelmintic agents; to the anthelmintic formulations containing such benzimidazoles as the essential active ingredient; and to methods for employing such formulations in the treatment and control of helminthiasis.

The infection known as helminthiasis involves infestation of the animal body, and particularly the gastrointestinal tract of domestic animals such as cattle, sheep, goats, swine, dogs and poultry, with species of parasitic worms known as helminths. The diseases attributable to such parasitic infections are very wide spread and present a serious economic problem to raisers of domestic animals. The diseased host almost inevitably suffers from such conditions as malnutrition, anemia and general weakness. However, in addition to the above conditions which, of course, necessitate increasing the nutrient intake of the host, helminthiasis often has much more disasterous consequences. The diseased host may suffer from severe inflammation of the intestinal lining resulting in hemorrhaging. Moreover, more advanced and uncontrolled cases of helminthiasis can lead to prostration and death. Obviously, helminthiasis is a disease of major concern from the standpoint of both public health and economic loss. The provision of methods and compositions which are effective in the treatment and control of helminthiasis, therefore, are of great importance to raisers of domestic animals.

The 2-trifluoromethyl- and 2-pentafluoroethylbenzimidazoles which serve as the essential active ingredient in the anthelmintic formulations of this invention may be represented by the following structural formula:

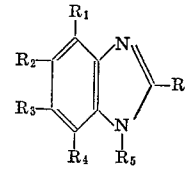

wherein R is a member selected from the group consisting of trifluoromethyl and pentafluoroethyl; $R_1$, $R_2$, $R_3$ and $R_4$ are members selected from the group consisting of hydrogen and halogen selected from the group consisting of fluorine, chlorine, bromine and iodine, provided that only one of $R_1$ $R_2$, $R_3$ and $R_4$ can be hydrogen; and $R_5$ is a member selected from the group consisting of hydrogen, loweralkyl, loweralkenyl, loweralkoxyloweralkyl, carboxyloweralkyl and loweralkyl esters thereof, loweralkanoyl, and aminoloweralkyl and the N-loweralkyl and N,N-diloweralkyl derivatives thereof; and alkali metal, alkaline earth metal and pharmaceutically acceptable amine salts thereof when $R_5$ is hydrogen or carboxyloweralkyl, and salts thereof with pharmaceutically acceptable acids when $R_5$ is aminoloweralkyl.

As used above, the terms, loweralkyl, loweralkoxy and loweralkanoyl, are intended to include both straight and branched chain loweralkyl, loweralkoxy and loweralkanoyl groups containing from 1 to 6 carbon atoms in the alkyl, alkoxy or alkanoyl moiety. Typical of such loweralkyl, loweralkoxy and loweralkanoyl groups are, for example, methyl ethyl, propyl, isopropyl, n-butyl, amyl, n-hexyl, methoxy, ethoxy, propoxy, isobutoxy, formyl, acetyl, propionyl, isobutyryl, and n-hexanoyl. The term, loweralkenyl, is intended to include both straight and branched chain loweralkenyl groups containing from 2 to 6 carbon atoms in the alkenyl moiety, such as for example, vinyl, allyl, propenyl, crotyl, isobutenyl and allenyl. The terms, alkali metal salt and akaline earth metal salt, are intended to include salts of alkali and alkaline earth metals, such as, for example, lithium, sodium, potassium, cesium, calcium, magnesium, barium and strontium. Pharmaceutically acceptable amine salts will include those derived from amines, such as, for example, ammonia, ethanolamine, diethanolamine, guanidine, arginine, lysine, ethylenediamine, piperazine and morpholine. Typical pharmaceutically acceptable acid salts will include those derived from inorganic and organic acids, such as, for example, hydrochloric acid, sulfuric acid, phosphoric acid, acetic acid, valeric acid, lactic acid, caproic acid, aspartic acid, glutamic acid, citric acid and tartaric acid.

The instant invention is based upon the discovery that the benzimidazoles described above show inherent applied use characteristics as anthelmintic agents, particularly against Haemonchus sp., Chabertia sp. and Oesophagostomum sp. The anthelmintic activity of these benzimidazoles has been confirmed by standard pharmacological techniques and it is contemplated that formulations containing dosage units of such benzimidazoles as the essential active ingredient will be employed in the treatment and control of helminthiasis.

The anthelmintic benzimidazoles are compounds known in the art and are either available commercially or may be prepared by techniques already fully described. Thus, for example, the benzimidazoles of this invention wherein $R_5$ is hydrogen are readily prepared by treating a trihalo or tetrahalo orthophenylene diamine with trifluoroacetic acid or with pentafluoropropionic acid or with a salt of functional derivative thereof. Introduction of the 1-substituent into the 2-trifluoromethyl or 2-pentafluoroethyl benzimidazoles so formed then may be achieved by conventional acylation or alkylation techniques. Conveniently, acylation is carried out by treating the benzimidazole with a loweralkanoyl anhydride in the presence of a salt of a loweralkanoic acid. Introduction of alkyl groups or substituted alkyl groups at the 1-position can be achieved by treating the benzimidazole with an appropriate alkylhalide in the presence of a base. The benzimidazoles of this invention wherein the 1-substituent is hydrogen behave as acids and will form salts with alkali metals, alkaline earth metals and pharmaceutically acceptable amines. Similar salts may be formed when the 1-substituent is of acidic character (i.e. carboxyloweralkyl). When the benzimidazoles of this invention bear a basic substituent at the 1-position (i.e. aminoloweralkyl or N-loweralkyl or N,N-diloweralkyl derivatives thereof), they will form salts with pharmaceutical acids. Many of these salts display greatly enhanced solubility as compered with the parent benzimidazole and are highly useful in applications where water soluble formulations are desired. These salts may be formed by conventional techniques, such as, for example, by contacting the benzimidazole with the desired acid or base followed by evaporation of the reaction mixture and conventional recovery and purification of the salt.

The substituted benzimidazoles, described hereinabove are useful in the treatment and/or prevention of helminthiasis in domesticated animals. For this purpose, they may be administered orally as a component of the animal feed stuff, in the drinking water, in salt blocks, and in unit dosage forms such as tablets, capsules, boluses, pastes and drenches. The amount of active ingredient required for optimum control of helminthiasis of course, varies in accordance with such factors as the particular compound employed, the species of animal to be treated, the species of infecting parasite, the severity of infection, and whether the compound is employed therapeutically or prophylactically. In general, the compounds described herein when administered orally to domestic animals in daily doses of from about 0.1 mg. to about 500 mg. per kilogram of animal body weight are highly effective in controlling helminthiasis without intolerable toxic effect. When the compounds are to be employed as therapeutic agents, good results are obtained when the animals are fed a daily dose of from about 5 mg. to about 500 mg. and preferably 15 mg. to 250 mg. per kilogram of body weight. Administration may be in a single dose or divided into a plurality of smaller doses over a period of 24 hours. Where prophylactic treatment is desired and the compounds are fed continuously, satisfactory results are obtained when the animals ingest daily dosages are from about 0.1 mg. to 100 mg. per kilogram of body weight.

The compounds of this invention when prepared as a unit dosage form such as a capsule, tablet, bolus, drench and the like, may be blended with one or more innocuous orally ingestible ingredients including diluents, fillers, binders, lubricants, disintegrating agents, suspending agents, wetting agents and the like. Suspending agents, such as, for example, gums, methylcellulose, ethylcellulose, hydroxyethylcellulose, polyvinylpyrrolidine and the like, are particularly valuable when a drench is desired and should be used in such amount as to permit a uniform suspension of the active ingredient in water. The exact quantity of suspending agent to be employed will depend upon the concentration of active anthelmintic ingredient and the particular suspending agent being utilized.

The unit dosage forms may be readily prepared by conventional formulating techniques and are particularly useful when administration is to be made in a single dose or divided doses over a period of 24 hours. In addition to the earlier mentioned ingredients, the solid compositions may also contain a material which when associated with the active ingredient maintains the active ingredient in inert or inoperative form so long as the composition remains in the acidic stomach, but which releases the active ingredient when the composition reaches the intestine. Such compositions, because enteric in character, are particularly useful for the treatment of animals suffering from severe helmintic infection of the intestinal tract. Provision of such enteric property can, for example, be accomplished by coating tablets and boluses in a conventional manner with one of the commonly employed enteric coatings such as those containing fatty acids, resins, waxes, synthetic polymers and the like.

The exact amount of active ingredient to be employed in the above compositions may vary provided that a sufficient amount is ingested to give the required dosage. In general, tablets, boluses and drenches containing from about 5 to 70% by weight of active ingredient may be satisfactorily employed to supply the desire dosage. A typical example of a bolus which may be used in accordance with the teaching of the invention is as follows:

|  | Gm. |
|---|---|
| 2-trifluoromethyl-4,5,7-trifluorobenzimidazole | 6.0 |
| Dicalcium phosphate | 1.0 |
| Starch | 0.7 |
| Guar gum | 0.16 |
| Talc | 0.11 |
| Magnesium sterate | 0.028 |

Another suitable composition for a bolus would be:

|  | Gm. |
|---|---|
| 2 - pentafluoroethyl - 4,5,6,7 - tetrafluorobenzimidazole | 6.0 |
| Dicalcium phosphate | 1.0 |
| Starch | 0.7 |
| Guar gum | 0.16 |
| Talc | 0.11 |
| Magnesium sterate | 0.028 |

This bolus is prepared by thoroughly mixing the benzimidazole of the particle size finer than 60 mesh with 0.43 gm. of starch in the form of an aqueous starch paste. The resulting mixture is then granulated in the usual manner, passed through a No. 10 mesh screen and dried in about 40–50° C. for about 8 hours. The dried material is then passed through a No. 16 mesh screen after which the guar gum and the balance of the starch are added and the mixture thoroughly blended. The remainder of the ingredients are then added and the entire mass totally mixed. A bolus of the desired size is then prepared in a standard manner by means of compression.

In addition to the suspending agents noted above, typical drench formulations advantageously may contain preservatives, such as, for example, sodium benzoate, methylparaben, ethylparaben, sorbic acid, benzalkonium chloride and the like, and wetting agents, such as, for example, soaps, fatty sulfate esters such as sodium lauryl sulfate, fatty aromatic sulfonates such as alkyl naphthalene sulfonates, condensation products of fatty acids and fatty alcohols with ethylene oxide, and fatty esters of sugars or polyhydric alcohols. Anti-foaming agents, such as, for example, various commercially available silicone oils, and anti-clumping agents, such as, for example, various forms of calcium silicate, also may be added if desired.

A suitable drench would contain the following ingredients in about an ounce of drench composition:

| 2-trifluoromethyl-4,5,7-trichlorobenzimidazole | gm | 4.5 |
|---|---|---|
| Benzalkonium chloride | ml | 0.6 |
| Antifoam emulsion | gm | 0.06 |
| Hydroxyethylcellulose | gm | 0.3 |
| Sodium phosphate monobasic | ml | 0.3 |
| Water, ml. to 30.0. | | |

Yet another suitable drench would contain the following ingredients in about an ounce of drench composition:

| | |
|---|---|
| 2-trifluoro-4,5,6,7-tetrachlorobenzimidazole gm | 4.5 |
| Benzalkonium chloride ml | 0.6 |
| Antifoam emulsion gm | 0.06 |
| Hydroxyethylcellulose gm | 0.3 |
| Sodium phosphate monobasic ml | 0.3 |
| Water, ml. to 30.0. | |

The levels of anthelmintic in these unit dosage forms may be varied within reasonable limits without altering the amounts of the other ingredients in the composition.

The benzimidazoles of this invention may be administered dispersed in or admixed with the normal elements of animal sustenance, i.e., the feed, drinking water or other liquids normally partaken by the animals. This method is preferred when it is desired to administer the active compounds continuously either as a therapeutic or prophylactic agent, for a period of several days or more. However, in such usage, it is to be understood that the present invention also contemplates the employment of compositions containing the active compounds intimately dispersed in or admixed with any other carrier or diluent which is inert with respect to the active ingredient, orally administrable and is tolerated by the animals. Such compositions may be utilized in the form of powders, pellets, suspensions and the like and are adapted to be fed to animals to supply the desired dosage or to be employed as concentrates or supplements and subsequently diluted with additional carrier or feed to produce the ultimate composition. Examples of carriers or diluents suitable for such compositions are solid orally ingestible carriers such as distillers' dried grains, alfalfa, corn meal, citrus meal, fermentation residues, ground oyster shells, attapulgus clay, wheat shorts, molasses solubles, corn cob meal, edible vegetable substances, toasted dehulled soya flour, soybean mill feed, antibiotic mycelia, soya grits, crushed limestone and the like. In the preparation of solid compositions the active ingredient is intimately dispersed or admixed throughout the feed or other solid carrier by methods such as grinding, stirring, milling or tumbling. By selecting proper diluents and by altering the ratio of carrier to active ingredient, compositions of any desired concentration may be prepared.

When anthelmintics such as those of the present invention are used for treating animals such as swine and particularly when the treatment is for the purpose of preventing or freeing the host from helminth infestation, the active agents are preferably administered as an ingredient of the feed. Where the compounds described above are provided as a constituent of the feed, the required dosage may be supplied with feed compositions containing from about 0.001%–3% by weight of the active compound. Such medicated feed compositions can be prepared for direct use by mixing the above amount of active ingredient directly with the feed. The medicated feeds may also be prepared by the use of feed supplements containing higher concentrations of the active ingredient uniformly dispersed in a solid edible carrier such as mentioned above. The feed supplements may then be diluted with the feed to produce the desired concentration of active ingredient for feed. Since it is convenient for the feed manufacturer to use about one pound of feed supplement for each ton of finished feed, the preferred concentration of active ingredient in the feed supplement is partly a function of the level of active ingredient desired in the finished feed. In general, feed supplements containing from about 5% to about 50% by weight of active ingredient may be satisfactorily employed to supply the desired dosage in the finished feed.

Examples of typical feed supplements containing the active compounds dispersed in a solid inert carrier are:

(a)                        Lbs.

| | |
|---|---|
| 2-trifluoromethyl-4,5,7-trichlorobenzimidazole | 5 |
| Wheat shorts | 95 |

(b)

| | |
|---|---|
| 2-trifluoromethyl-4,5,6-trifluorobenzimidazole | 15 |
| Ground oyster shells | 40 |
| Citrus meal | 45 |

(c)

| | |
|---|---|
| 2-trifluoromethyl-4,5,6,7-tetrachlorobenzimidazole | 25 |
| Corn meal | 75 |

(d)

| | |
|---|---|
| 2-trifluoromethyl-4,5,6,7-tetrafluorobenzimidazole | 30 |
| Soybean mill feed | 70 |

(e)

| | |
|---|---|
| 2-trifluoromethyl-4,5,7-tribromobenzimidazole | 15 |
| Molasses solubles | 85 |

(f)

| | |
|---|---|
| 2-pentafluoroethyl-4,5,7-trichlorobenzimidazole | 5 |
| Wheat shorts | 95 |

(g)

| | |
|---|---|
| 2-pentafluoroethyl-4,5,6,7-tetrachlorobenzimidazole | 15 |
| Ground oyster shells | 40 |
| Citrus meal | 45 |

(h)

| | |
|---|---|
| 2-pentafluoroethyl-4,5,7-trifluorobenzimidazole | 25 |
| Corn meal | 75 |

(i)

| | |
|---|---|
| 1 - ethyl-2-trifluoromethyl-4,5,7-trichlorobenzimidazole | 30 |
| Soybean mill feed | 70 |

(j)

| | |
|---|---|
| 1 - carboxyethyl - 2 - trifluoromethyl-4,5,7-trichlorobenzimidazole | 15 |
| Molasses solubles | 85 |

In the preparation of these and similar feed supplements, the active ingredient is added to the carrier and the whole mixed to give substantially uniform dispersion of the anthelmintic agent in the carrier.

The following examples are offered to illustrate typical preparations of the anthelmintic benzimidazoles of this invention. These techniques are well-known in the art and do not form a part of the instant invention.

EXAMPLE 1

2-trifluoromethyl-4,5,7-trichlorobenzimidazole

Add 1.14 gm. of trifluoroacetic acid to 2.1 gm. of 3,4,6-trichloro-o-phenylene in 75 ml. of 4 N hydrochloric acid. Heat the mixtures at reflux for three hours. Cool the reaction mixture and neutralize with 10% aqueous sodium carbonate. Separate the precipitate by filtration, wash with water and recrystallize methylene chloride to obtain 2-trifluoromethyl-4,5,7-trichlorobenzimidazole.

By repeating the process of Example 1 and substituting an equivalent quantity of 3,4,6-trifluoro-o-phenylenediamine, 3,4,5-triiodo-o-phenylenediamine, 3,4,5,6-tetrafluoro - o - phenylenediamine or 3,4,5,6-tetrachloro-o-phenylenediamine for the 3,4,6-trichloro-o-phenylenediamine, there may be prepared 2-trifluoromethyl-4,5,7-trifluorobenzimidazole,
2-trifluoromethyl-4,5,6-triiodobenzimidazole,
2-trifluoromethyl-4,5,6,7-tetrafluorobenzimidazole and
2-trifluoromethyl-4,5,6,7-tetrachlorobenzimidazole respectively.

EXAMPLE 2

2-pentafluoroethyl-4,5,6,7-tetrachlorobenzimidazole

Add 1.64 gm. of pentafluoropropionic acid to 2.44 gm. of 3,4,5,6-tetrachloro-o-phenylenediamine in 100 ml. of 4 N hydrochloric acid. Heat the reaction mixture at reflux for four hours. Cool the reaction mixture to room temperature and neutralize with 10% aqueous sodium carbonate. Separate the precipitate by filtration, wash with water and recrystallize from ethyl acetate to obtain 2-pentafluoromethyl-4,5,6,7-tetrachlorobenzimidazole.

By repeating the process of Example 2 and substituting an equivalent quantity of 3,4,5,6-tetrafluoro-o-phenylenediamine, 3,4,5-trichloro-o-phenylenediamine, 3,4,5-tribromo-o-phenylenediamine, or 3,4,6-trifluoro-o-phenylene for the 3,4,5,6-tetrachloro-o-phenylenediamine, there may be prepared 2-pentafluoroethyl-4,5,6,7-tetrafluorobenzimidazole,
2-pentafluoroethyl-4,5,7-trichlorobenzimidazole,
2-pentafluoroethyl-4,5,6-tribromobenzimidazole and
2-pentafluoroethyl-4,5,6,7-tetrachlorobenzimidazole, respectively.

EXAMPLE 3

1 - acetyl - 2 - trifluoromethyl - 4,5,6,7-tetrachlorobenzimidazole

Heat for four hours at 100° C. a solution of 3.24 gm. of 2-trifluoromethyl-4,5,6,7-tetrachlorobenzimidazole, 1 ml. of acetic anhydride and 1.0 gm. of sodium acetate in 5 ml. of pyridine. Flood the reaction mixture with water and separate the precipitate by filtration. Recrystallize from methanol to obtain 1-acetyl - 2 - trifluoromethyl-4,5,6,7-tetrachlorobenzimidazole.

By substituting an equivalent quantity of any desired loweralkanoyl anhydride for the acetic anhyride used above, the corresponding loweralkanoyl group may be introduced at the 1-position. The same reaction may be applied to any desired trihalo or tetrahalo 2-trifluoromethyl- or 2-pentafluoroethylbenzimidazole starting material to prepare the corresponding 1-loweralkanoyl substituted derivative.

EXAMPLE 4

1-methyl-2-pentafluoroethyl-4,5,6,7-tetrachlorobenzimidazole

Add 150 mg. of methyl iodide to a solution of 374 mg. of 2 - pentafluoroethyl - 4,5,6,7 - tetrachlorobenzimidazole and 80 mg. of sodium methoxide in 5 ml. of dimethyl formamide. Allow the mixture to stand at room temperature for twenty hours and add water. Separate the precipitate by filtration and recrystallize from cyclohexane to obtain 1-methyl-2-pentafluoroethyl-4,5,6,7-tetrachlorobenzimidazole.

By repeating the process of Example 4 and substituting an equivalent quantity of any desired loweralkyl halide, loweralkenyl halide, loweralkoxyloweralkyl halide, carboxyloweralkyl halide or loweralkyl ester thereof or aminoloweralkyl halide for the N-loweralkyl or N,N-diloweralkyl derivatives thereof for the methyl iodide used above, the corresponding loweralkyl group, loweralkenyl group, loweralkoxyloweralkyl group, carboxyloweralkyl group or loweralkyl ester thereof or aminoloweralkyl group or the N-loweralkyl or N,N-diloweralkyl derivative thereof may be added at the 1-position. The same reaction, of course, may be applied to any desired trihalo or tetrahalo 2-trifluoromethyl- or pentafluoroethylbenzimidazole starting material to prepare the corresponding 1-substituted benzimidazole.

The instant invention is particularly pointed out and distinctly claimed as follows:

What is claimed is:

1. The method for treatment and control of helminthiasis in animals which comprises orally administering to an animal infected with helminthis an anthelmintically effective amount of a compound selected from the group consisting of benzimidazoles having the formula:

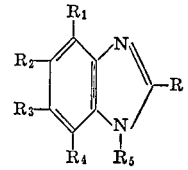

wherein R is a member selected from the group consisting of trifluoromethyl and pentafluoroethyl; $R_1$, $R_2$, $R_3$ and $R_4$ are members selected from the group consisting of hydrogen and halogen selected from the group consisting of fluorine, chlorine, bromine and iodine, provided that only one of $R_1$, $R_2$, $R_3$, and $R_4$ can be hydrogen; and $R_5$ is a member selected from the group consisting of hydrogen, loweralkyl, lower alkenyl, loweralkoxyloweralkyl, carboxyloweralkyl and loweralkyl esters thereof, loweralkanoyl, and aminoloweralkyl and the N-loweralkyl and N,N-diloweralkyl derivatives thereof; and alkail metal, alkaline earth metal and pharmaceutically acceptable amine salts thereof when $R_5$ is hydrogen or carboxyloweralkyl, and salts thereof with pharmaceutically acceptable acids when $R_5$ is aminoloweralkyl.

2. The method according to claim 1 wherein the active benzimidazole is administered in a daily dose of from 0.1 mg. to 500 mg. per kilogram of animal body weight.

3. The method according to claim 3 wherein the active benzimidazole is 2 - trifluoromethyl - 4,5,7 - trichlorobenzimidazole.

4. The method according to claim 3 wherein the active benzimidazole is 2 - trifluoromethyl - 4,5,7 - tetrachlorobenzimidazole.

5. The method according to claim 3 wherein the active benzimidazole is 2 - pentafluoroethyl - 4,5,7 - trichlorobenzimidazole.

6. The method according to claim 3 wherein the active benzimidazole is 2 - pentafluoroethyl - 4,5,7 - tetrachlorobenzimidazole.

References Cited

UNITED STATES PATENTS 3,676,545  7/1972  Saggers _____ 424—273

FOREIGN PATENTS 1,087,561  10/1967  Great Britain.

SAM ROSEN, Primary Examiner

U.S. Cl. X.R.

424—273